March 27, 1962  C. K. ALEXANDER  3,027,175
BUSHING FOR FRONT WHEEL SUPPORT MEMBER
Filed March 23, 1959

INVENTOR.
CHARLES K. ALEXANDER
BY
Chester W. Brown
ATTORNEY

United States Patent Office 3,027,175
Patented Mar. 27, 1962

3,027,175
BUSHING FOR FRONT WHEEL SUPPORT MEMBER
Charles K. Alexander, 6437 Betsy Ross Place, Milwaukee, Wis.
Filed Mar. 23, 1959, Ser. No. 801,360
4 Claims. (Cl. 280—96.1)

This invention relates to improvement in bushing mounting. The method of mounting a bushing and more particularly the arrangement for removing worn bushing, substituting a new bushing and increasing the bushing bearing in its mounting, hereinafter disclosed, are helpful in repair work embodying the bushing of my invention.

A source of considerable trouble in the maintenance of front wheel alignment in an automobile is in the bearing support. The several parts are subject to excessive wear which is rapidly multiplied particularly when the parts are subjected to extreme vibrations. When the several parts are thus damaged it has heretofore been the practice to replace all of the parts including the mounting and bushings. This is expensive and in many cases is not incurred by the automobile owner who prefers to drive with the worn defective parts and run the risk of possible accidents.

The principle object of this invention is to provide a bushing assembly which may be incorporated in a standard support and which when so mounted affords an increased area mechanical strength between the support and bushing which will insure proper wheel alignment and adjustment when required.

Another object is to provide a bushing assembly which may be easily and quickly substituted for a worn bushing and thereby avoiding the necessity of substituting a completely new front wheel supporting structure in an automobile.

A further object is to provide a simple and facile tool for removing a worn bushing and mounting a new bushing with its added reinforcing elements in a support.

A still further object is to provide a method whereby a worn bushing may be easily removed from a front wheel support and replaced by a new bushing with elements affording greater mechanical strength between the bushing and its support.

Like parts in the drawings are identified by the same reference characters throughout the several views.

Figure 7:
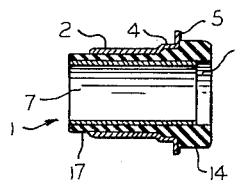
FIG. 7 is a sectional view of the component parts of the bushing as supplied by the manufacturer.

Attention is first directed to FIG. 7 for illustration of the component parts of the bushing although this forms no part of my invention per se. The bushing comprises an extruded outer metal cylinder 1 having a portion 2 which in part serves as a bearing in the A frame 3 (FIG. 1), a portion 4 of increased diameter which fixes the position of the bushing in the frame and a radial flange 5. A rubber tube 6, or other resilient material, is embraced by the outer cylinder 1 and serves to absorb shock encountered by the front wheel of an automobile. An inner metal cylinder 7 is positioned in the tube 6 and is expanded to firmly engage the outer cylinder 1 and tube 6.

Figure 1:
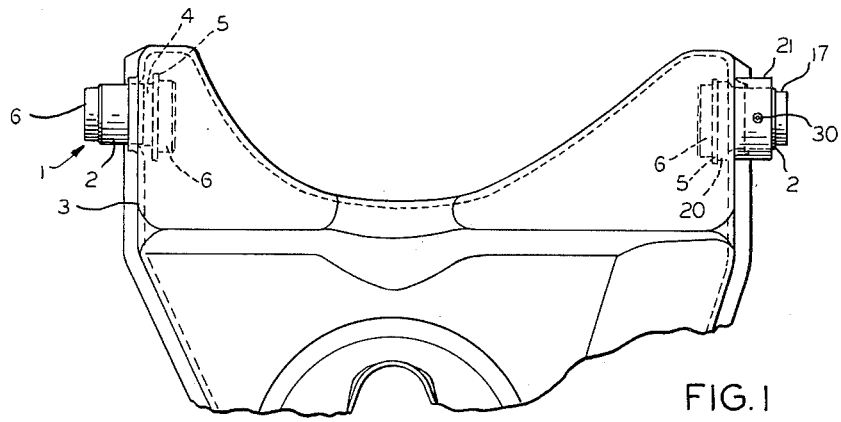
FIG. 1 is a fragmentary view of a front wheel support or so-called A frame of an automobile showing an old bushing on one side of the frame and a new one on the opposite side.
Figure 2:
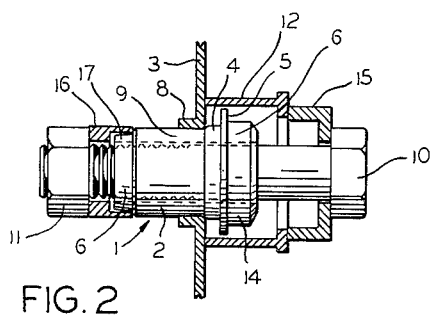
FIG. 2 is a fragmentary-sectional view of the frame with tool for removing the bushing in place.

As indicated in FIGS. 1 and 2, in the original assembly of the A frame 3 and bushing 1, the total bearing surface between them is limited by the engaged circumferential area of the portion 2 of the outer metal cylinder and the extruded flange 8 on the A frame. It is in this area 9 that wear is produced and subsequently requires replacement of the bushing and frame as presently practiced. It will be obvious that, when the engaged surfaces become worn, it is impossible to thereafter realign the front wheel of an automobile with any accuracy.

However, I have discovered that a new bushing can replace the old one in the old frame if added mechanical support is provided. I have further found that it is not always necessary to provide a new bushing, if, in remounting the bushing, the elements herein identified are utilized.

The tool for removing the worn bushing 1 comprises a bolt 10 which passes freely through the bushing, nut 11 threaded on the bolt, an inwardly flanged cylinder 12 having inner diameter greater than the diameter of the flange 5 on the bushing and of sufficient depth to permit the bushing to move into the cylinder, a second inwardly flanged cylinder 16 engaging the flange on cylinder 12 and of sufficient depth to loosely receive the enlarged portion 14 on the rubber cylinder 6, and a third inwardly flanged cylinder 15 having an inner diameter loosely receiving the enlarged end 14 on the rubber cylinder, the depth of the cylinder 16 being sufficient to receive the end 17 on the rubber cylinder 6. The outer diameter of the cylinder 16 is less than the inner diameter of the flange 8 on the A frame 3.

Figure 3:
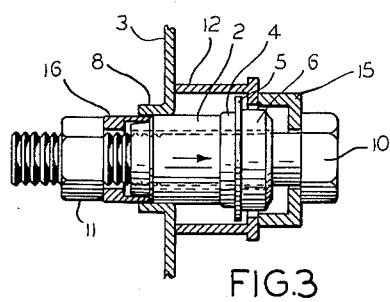
FIG. 3 is a view similar to FIG. 2 showing the bushing substantially removed.

When the tool is assembled as indicated in FIG. 2, the bolt 10 and nut 11 will be relatively rotated to draw the cylinder 15 into engagement with cylinder 12 which in turn engages the A frame as the cylinder 16 engages the outer metal cylinder 2 of the bushing 1 at which point further relative rotation of the bolt and nut will cause the bushing 1 to move out of the flange 8 on the A frame 3 until it reaches a point (see FIG. 3) where it may be freely removed from the frame. Assuming the maximum peripheral diameter of the nut 11 to be less than the inner diameter of the flange 8, the entire elements may be removed as a unit by passing the nut through the flange 8, otherwise the nut may be removed from the bolt after the bushing has been released from the frame as indicated.

Figure 4:
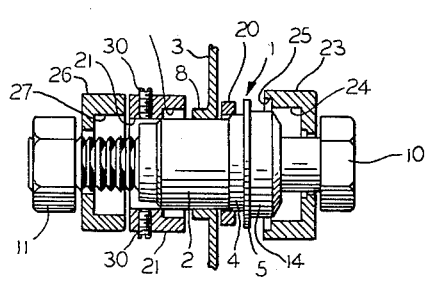
FIG. 4 is a fragmentary-sectional of the frame with a new bushing assembly and tool for assembling in readiness for operation.
Figure 5:
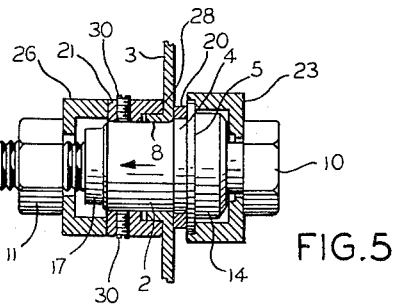
FIG. 5 is a view similar to FIG. 4 showing the bushing assembly as it appears when the assembling operations are completed.

FIGS. 4 and 5 show the elements of my bushing assembly and the tool for mounting the assembly. FIG. 4 shows the bushing assembly and tool as they appear preparatory to congregating the bushing assembly as a unitary combination. FIG. 5 shows the bushing assembly as a completed unit and the tool as it appears upon completion of the operation.

The bushing is substantially the same as that previously described, except that it may be new and unused, although it is to be understood that the worn bushing may be used if it is deemed expedient by the repairman. The bushing assembly comprises the bushing 1, a filler ring 20 having an inner diameter which will afford a tight push fit with the portion 4 on the bushing, and a bracing cylinder 21 having a relatively small bore of a diameter which will insure a tight push fit with the portion 2 on the bushing. The larger bore in the cylinder 21 is of a diameter sufficient to receive the flange 8 on the A frame 3. Preferably the larger bore 22 should snugly fit the flange 8, but it has been found that the flange is at times of increased diameter or distorted after use and therefore an allowance in the diameter of the bore 22 must be made to accommodate the flange.

The tool for uniting the elements of the bushing assembly comprises a bolt 10 which extends loosely through the bushing 1, a nut 11 threaded on the bolt, an inwardly flanged cylinder 23 recessed at 24 to freely receive the enlarged end 14 on the rubber cylinder 6 and provided with an annular recess 25 to receive and engage the flange 5 on the bushing, and a second inwardly flanged cylinder 26 recessed at 27 to freely receive the end 17 on the rubber cylinder 1. When the several parts are assembled as indicated in FIG. 4, the bolt 10 and nut 11 are relatively rotated to draw the element toward each other to the relative positions shown in FIG. 5 at which time the filler ring 20 securely embraces the portion 5 on the bushing and is engaged between the A frame 3 and flange 5 on the bushing. At the same time the bracing cylinder 21 is firmly engaged with portion 2 on the bushing 1 and the inner margin 28 thereof firmly engages the A frame.

Figure 6:
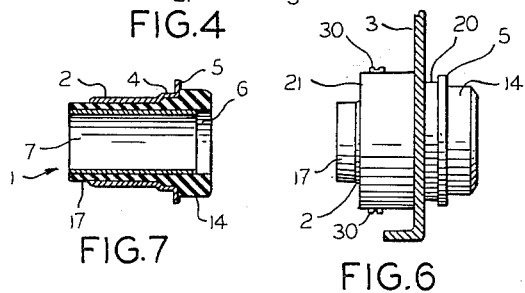
FIG. 6 is a view similar to FIG. 5 showing the bushing assembly in place and the tool removed.

As indicated in FIGS. 4, 5 and 6 the bracing cylinder 21 is provided with a pair of diametrically opposed set screws 30 which are firmly set to engage the portion 2 on the bushing to serve as additional insurance that the several parts of the bushing assembly will remain in fixed relation under the severe stresses to which they may be subjected.

When the bushing assembly has been united, the tool is then removed and FIG. 6 clearly indicates the appearance of the assembly. Since the filler ring 20 and the margin 28 on the bracing cylinder 21 are firmly clamped to the A frame, they assist the bracing cylinder in acting as an extension of the bearing surface between the A frame 3 and bushing 1 by reason of the firm push fit between the bracing cylinder bore and portion 2 on the bushing.

From the foregoing it will be apparent that I have provided a novel arrangement of elements for repairing the front wheel support of an automobile which avoids the replacement of worn parts, at a minimum of expense, which adds considerable strength to the support much in excess of that originally present in the support, which insures that front wheel alignment may be assured for a much longer period of time than heretofore possible, which simplifies the operations of repair, and which increases the area of effective support between an A frame and bushing.

It will be understood that the embodiment herein disclosed exemplifies my invention and is subject to variations without departing from the spirit of my discovery, and, therefore, the appended claims are to be interpreted in the light of the scope of my inventions and are to bear a limited interpretation only when the terms are so justified by the foregoing disclosure.

I claim:

1. In a front wheel support for an automobile comprising a frame having an apertured wall with an annular flange surrounding the aperture and a cylindrical bushing extending through the aperture in press fit engagement with said flange and including radially extending flange spaced from said frame in combination with said radially extending flange, an annular member disposed about said bushing in press fit engagement therewith and clamped between said frame and radially extending flange, and a bracing cylinder on the side of said frame opposite that of said annular member, said cylinder embracing said bushing in press fit engagement therewith and encompassing said flange on said frame and in clamping engagement with said frame.

2. In a front wheel support for an automobile comprising a frame having an apertured wall with an annular flange surrounding the aperture, the combination with cylindrical bushing extending through said aperture and in press fit engagement with said annular flange, said bushing having a radial flange on one side of said frame spaced therefrom, said bushing extending out of said aperture on the opposite side of said frame, of an annular filler ring disposed about said bushing and clamped between said frame and radial flange and in press fit engagement with said bushing, and a bracing cylinder embracing the projecting end of said bushing and said annular flange on said frame and in press fit engagement with said bushing and clamped to said frame about said annular flange.

3. In a front wheel support for an automobile comprising a frame having an apertured wall with an annular flange surrounding the aperture, the combination with cylindrical bushing extending through said aperture and in press fit engagement with said annular flange, said bushing having a radial flange on one side of said frame spaced therefrom, said bushing extending out of said aperture on the opposite side of said frame, of an annular filler ring disposed about said bushing and clamped between said frame and radial flange and in press fit engagement with said bushing, a bracing cylinder embracing the projecting end of said bushing and said annular flange on said frame and in press fit engagement with said bushing and clamped to said frame about said annular flange, and a set-screw in said bracing cylinder engaging the projecting portion of said bushing.

4. In combination with a front wheel support for an automobile, said support having an aperture therein defined by an annular flange, of a cylindrical bushing extending through said aperture and in press fit engagement with said annular flange, said bushing having on one side of said support a radial flange spaced therefrom and defining with said support an annular channel about said bushing, a filler member in press fit engagement with said bushing and substantially filling said annular channel, and a bracing member on said bushing disposed on a side of said support opposite that of said filler member and in press fit engagement with said bushing, said filler and bracing members jointly clamping said support and providing a bearing surface for said bushing in excess of that provided by said annular flange.

References Cited in the file of this patent

UNITED STATES PATENTS

| | | |
|---|---|---|
| 328,235 | Latta | Oct. 13, 1885 |
| 1,736,529 | Goeller | Nov. 19, 1929 |
| 1,746,280 | Quint | Feb. 11, 1930 |
| 1,939,444 | Geyer | Dec. 12, 1933 |
| 2,496,402 | McVeigh et al. | Feb. 7, 1950 |
| 2,631,866 | Leighton | Mar. 17, 1953 |
| 2,684,527 | Hedlund | July 27, 1954 |
| 2,727,766 | Grashow | Dec. 20, 1955 |
| 2,858,155 | Peppercorn | Oct. 28, 1958 |
| 2,882,079 | Hoopes | April 14, 1959 |